(12) United States Patent
Bohrer et al.

(10) Patent No.: US 9,193,315 B2
(45) Date of Patent: Nov. 24, 2015

(54) METHOD AND APPARATUS FOR OPERATING A DEVICE IN A VEHICLE WITH A VOICE CONTROLLER

(75) Inventors: Lorenz Bohrer, Berlin (DE); Christof Bobzin, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 1145 days.

(21) Appl. No.: 12/740,847

(22) PCT Filed: Oct. 31, 2008

(86) PCT No.: PCT/EP2008/064830
§ 371 (c)(1),
(2), (4) Date: Sep. 15, 2010

(87) PCT Pub. No.: WO2009/056637
PCT Pub. Date: May 7, 2009

(65) Prior Publication Data
US 2011/0007006 A1    Jan. 13, 2011

(30) Foreign Application Priority Data
Nov. 2, 2007   (DE) .......................... 10 2007 052 345

(51) Int. Cl.
*B60R 16/037*   (2006.01)
*G06F 3/0484*   (2013.01)
(52) U.S. Cl.
CPC ........ *B60R 16/0373* (2013.01); *G06F 3/04842* (2013.01)
(58) Field of Classification Search
CPC ....................... B60R 16/0373; G06F 3/04842
USPC .................................. 345/156–184; 704/275
See application file for complete search history.

(56) References Cited

U.S. PATENT DOCUMENTS

| 5,450,525 A | 9/1995 | Russell et al. ................ 395/2.84 |
| 2002/0077830 A1* | 6/2002 | Suomela et al. ............. 704/275 |

(Continued)

FOREIGN PATENT DOCUMENTS

| DE | 19715325 | 10/1998 | ............. B60R 16/02 |
| DE | 19914631 A1 | 10/2000 | ............. G01C 21/36 |

(Continued)

OTHER PUBLICATIONS

2007 Infiniti Navigation Manual, pp. 2-23 to 2-28, published Dec. 16, 2005.*

(Continued)

*Primary Examiner* — Ryan A Lubit
(74) *Attorney, Agent, or Firm* — Slayden Grubert Beard PLLC

(57) ABSTRACT

In a method for operating a device in a vehicle, an operating step is selected and a function associated with the operating step is performed. The operation of selecting the operating step automatically activates a voice controller for input following the operating step. An apparatus for operating a device in a vehicle has a display apparatus for displaying operating steps, a first operating unit for haptic input for selecting an operating step, a voice control unit for voice input for selecting an operating step, and a control unit which is coupled to the display apparatus, the first operating unit and the voice control unit and can be used to generate control signals for performing a function associated with a selected operating step. The control unit is designed in such a manner that the operation of selecting an operating step automatically activates the voice control unit for input following the operating step.

16 Claims, 2 Drawing Sheets

(56) References Cited

U.S. PATENT DOCUMENTS

| | | | | |
|---|---|---|---|---|
| 2004/0056848 A1* | 3/2004 | Sasaki | | 345/173 |
| 2004/0215464 A1* | 10/2004 | Nelson | | 704/275 |
| 2007/0256027 A1* | 11/2007 | Daude | | 715/810 |
| 2007/0294640 A1* | 12/2007 | Eskelinen et al. | | 715/835 |

FOREIGN PATENT DOCUMENTS

| | | | | |
|---|---|---|---|---|
| DE | 10028869 | | 1/2001 | G06F 3/02 |
| DE | 10012572 A1 | | 9/2001 | G10L 15/00 |
| DE | 10360655 | | 7/2005 | B60R 16/02 |
| DE | 102005007317 A1 | | 8/2006 | G10L 15/22 |
| EP | 0686525 | | 12/1995 | B60R 16/02 |
| EP | 1555652 A1 | | 1/2004 | G10L 15/26 |

OTHER PUBLICATIONS

Google Search showing evidence of publication date of 2007 Infiniti Navigation Manual, performed Jan. 24, 2014.*

International Search Report for Application No. PCT/EP2008/064830 (3 pages), May 26, 2009.

* cited by examiner

METHOD AND APPARATUS FOR OPERATING A DEVICE IN A VEHICLE WITH A VOICE CONTROLLER

CROSS-REFERENCE TO RELATED APPLICATIONS

This application is a U.S. National Stage Application of International Application No. PCT/EP2008/064830 filed Oct. 31, 2008, which designates the United States of America, and claims priority to German Application No. 10 2007 052 345.0 filed Nov. 2, 2007, the contents of which are hereby incorporated by reference in their entirety.

TECHNICAL FIELD

The present invention relates to a method for operating a device of a vehicle in which an operating step is selected and a function associated with the operating step is carried out. The invention further relates to an apparatus for operating a device of a vehicle comprising a display device for displaying operating steps, a first operating unit for a haptic input for selecting an operating step, a second operating unit designed as a voice controller unit for a linguistic input for selecting an operating step and a control unit coupled to the display device, the first operating unit and the voice controller unit and by means of which control signals for performing a function associated with a selected operating step are producible.

BACKGROUND

Originally the different devices provided in a vehicle, in particular a motor vehicle, have been operated via separate operating elements. For example, there have been rotary controls for adjusting the ventilation and the temperature, switches for adjusting the different ventilation ducts, switches for operating the illumination devices for the interior of the vehicle, respective switches for the lighting and headlamp devices at the outside of the vehicle and operating elements for a radio or a CD player. In the meantime provided in modern motor vehicles are so many devices for adjusting different vehicle functions, information systems including driver assistance systems and entertainment systems that it is no longer convenient to provide separate operating elements for all vehicle devices. For this reason, the operation of the manifold vehicle devices is carried out by means of a integrative operational concept comprising few operating elements which are operated in conjunction with a display device. In doing so, push buttons are displayed by the display of the display device which may be selected by the operating element.

The operation of the different devices of the vehicle and the picking up of information that can be provided by these devices possibly stress the concentration of the driver such that the simultaneous safe control of the motor vehicle by the driver is not possible or only in a limited manner. Therefore, if the driver desires to operate devices of the vehicle the information of which are displayed via the display device he/she possibly should perform this prior to the start of a drive or should interrupt the drive for the operation. However, such interferences are not desired for the operation. Often they result in that the driver operates the devices of the vehicle during the drive although this may result in a distraction which may constitute a safety risk.

It is therefore desirable to display the information in the motor vehicle such that it can be absorbed by the driver in a fast and intuitive manner so that the comprehension of the information displayed does not result in a distraction of the driver during the drive. Further, the operation should be operable so intuitive, simple and fast that the driver also may operate the devices of the vehicle, the information of which is displayed by the display device, during the drive even if where required complex structures may be displayed by the display device. The information representation and the operation in the motor vehicle corresponding to an information representation therefore add to the safety of driving the motor vehicle.

In particular in order to provide to the driver of a vehicle an operation of the devices of the vehicle in which he/she does not have to avert his/her eyes from the driving action it is well-known to utilize a voice controller. In this case, the driver pushes a so called push-to-talk button which for example may be provided for at the steering wheel whereupon he/she carries out a linguistic input. After pushing the push-to-talk button the voice controller is activated. During a given time interval acoustic signals are recorded by a microphone in the interior of the vehicle and are analyzed by means of a voice recognition unit and converted into control instructions. It is a disadvantage of such an operational system that the voice controller does not integrate smoothly into the operation of a multi-functional operating device, for example, but voice instructions may only be input by previously pushing the push-to-talk button.

SUMMARY

According to various embodiments, a method and an apparatus for operating a device of a vehicle can be provided which provides an improved voice controller.

According to an embodiment, in a method for operating a device of a vehicle, an operating step is selected and a function associated with the operating step is carried out, wherein by means of the selection of the operating step a voice controller for an input following the operating step is activated automatically.

According to a further embodiment, the input following the operating step may be carried out both by means of a linguistic input and by means of a haptic input. According to a further embodiment, it can be defined by means of an input if the voice controller for an input following the respective operating step is automatically activated by means of the selection of the next operating step or the following operating steps. According to a further embodiment, the operating steps available for selecting can be displayed to the user by means of push buttons on a display device, and that a voice controller symbol associated with the push buttons is displayed if by means of the selection of the operating step the voice controller further is activated automatically for an input following the operating step. According to a further embodiment, an operating activity may be carried out which comprises several operating steps which are carried out by means of a linguistic input and/or a haptic input, and independent of wether a preceding operating step is carried out by means of a linguistic input or a haptic input the following operating step may be carried out by means of a linguistic input or a haptic input. According to a further embodiment, there can be a limited number of options in an operating step, the options can each be associated with words or phrases consisting of several words, and by a voice recognition of the voice controller the vocabulary can be limited to the words associated with the options or which occur in the phrases of the options for the current operating step. According to a further embodiment, the haptic input can be carried out by contacting a touch-sensitive surface with an object.

According to another embodiment, an apparatus for operating a device of a vehicle may comprise a display device for displaying operating steps, a first operating unit for a haptic input for selecting an operating step, a voice controller unit for a linguistic input for selecting an operating step, and a control unit coupled to the display device, the first operating unit and the voice controller unit, and by means of which control signals are producible for performing a function which is associated with a selected operating step, wherein the control unit is designed such that by means of a selection of an operating step the voice controller unit is automatically activated for an input following the operating step.

According to a further embodiment of the apparatus, the voice controller unit may comprise a microphone for detecting spoken speech within the vehicle and a voice recognition unit which converts speech detected by the microphone into input signals which are processable by the control unit. According to a further embodiment of the apparatus, the voice recognition unit can be coupled to a memory in which the vocabulary is stored, the words or phrases consisting of several words of which are convertible into input signals by the voice recognition unit, and in an operating step the vocabulary may be limited depending on the words or the words occurring in the phrases associated with a limited number of options of the operating step. According to a further embodiment of the apparatus, the first operating unit may comprise a touch-sensitive surface. According to a further embodiment of the apparatus, the first operating unit and a display of the display device can be provided by a touchscreen. According to a further embodiment of the apparatus, the first operating unit can be located offset from the display device in the vehicle.

BRIEF DESCRIPTION OF THE DRAWINGS

The invention is now described by means of an exemplary embodiment and relating to the drawings.

DETAILED DESCRIPTION

Figure 1:
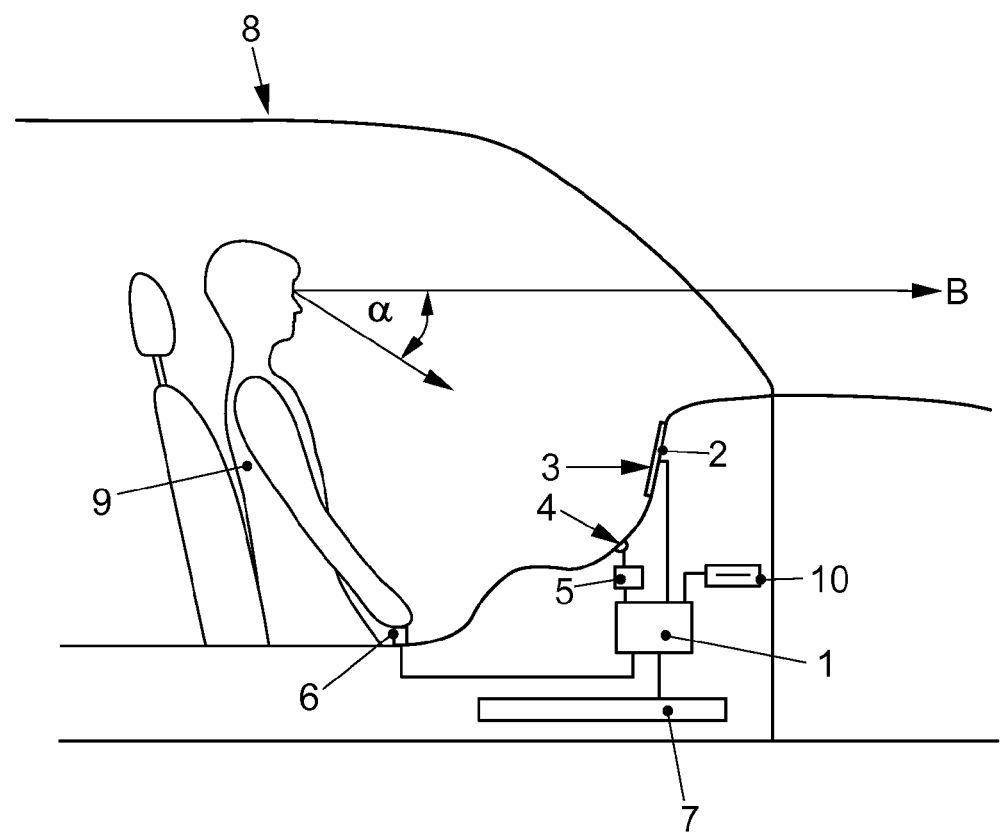
FIG. 1 schematically shows an exemplary embodiment of an operating apparatus.

According to various embodiments, the selection of the operating step automatically activates a voice controller for an input following the operating step.

Therefore, it is not required in this case that the user carries out a further operating step for the voice controller in that he/she for example pushes a so called push-to-talk button. Rather, the voice controller is automatically activated for the input following the operating step. However, the input following the operating step does not necessarily have to be carried out by means of a linguistic input.

Preferably, it also may be carried out by means of a haptic input, i.e. for example by operating an operating element or by touching a touchscreen.

Preferably it may be determined by means of an input wether by means of the selection of the next operating steps or the following operating steps automatically the voice controller shall be activated for an input following the respective operating step. Therefore, a global setting may be carried out for the voice controller and that for the operating steps for which a voice controller is provided. According to a preferred embodiment the operating steps available for selecting are displayed to the user by means of push buttons on a display device. In doing so, a voice controller symbol associated with the push buttons is displayed if further the voice controller is automatically activated for an input following the operating step by the selection of the operating step. By means of this voice controller symbol the user may also detect if a voice controller for an input following the operating step is actually feasible.

According to an embodiment of the method an operating activity is carried out which comprises several operating steps which are carried out by means of a linguistic and/or a haptic input. Independent of wether a preceding operating step was carried out by means of a linguistic or a haptic input the following operating step may be carried out by means of a linguistic input or a haptic input in the method. Thereby, the user is given high flexibility. He/she does not have to define if the input is carried out in a linguistic or haptic manner. Both input options are arranged for the operating steps comprising voice controller function.

Typically, a limited number of options exists for an operating step. In an embodiment of the method, associated with the options each are words or phrases consisting of several words. In the method henceforth the vocabulary of a voice recognition of the voice controller is limited to the words associated with the options or which appear in the phrases of the options for the current operating step.

The haptic input particularly is carried out by means of touching a touch-sensitive surface with an object, such as for example the finger of the user. The device for the haptic input therefore may be combined with the display of a display device in that a so called touchscreen is provided for.

The apparatus according to various embodiments is characterized in that the control unit is designed such that by means of the selection of an operating step the voice controller unit is automatically activated for an input following the operating step. The voice controller unit may comprise a microphone for detecting speech spoken in the inside of the vehicle and a voice recognition unit which converts speech detected by the microphone into input signals which are processable by the control unit. Preferably, the voice recognition unit may be coupled to a memory in which a vocabulary is stored whose words or phrases consisting of several words are convertible into input signals by the voice recognition unit. Preferably, in an operating step the vocabulary may be limited depending on the words or the words occurring in the phrases which are associated with a limited number of options of the operating step.

According to an embodiment of the apparatus, the first operating unit comprises a touch-sensitive surface. The first operating unit and a display of the display device in particular are made available by a touchscreen. Further it is feasible alternatively or in addition that the first operating unit in the vehicle is arranged offset from the display device.

At first, described in principle with regard to FIG. 1 is the configuration of the operating apparatus according to various embodiments which also is capable of performing the method according to various embodiments:

The apparatus comprises a central control unit 1. It is coupled to a display device 2 which comprises a display 3. The display may be a per se well-known liquid crystal display. However, any other displays for visually displaying information may be applied. The display device 2 is arranged in the vehicle 8 such that the display 3 is in the primary field of vision of the driver. This "primary field of vision" typically is defined such that the viewing direction B of the driver 9 is an angular range in a vertical plane, the vertical plane intersecting the eyes of the driver 9 and being located in the longitudinal direction of the vehicle, wherein the angular range deviates by a certain angle α downwards and upwards, respectively, from the horizontal. The primary field of vision of the driver 9 thereby is defined such that the angle α is less than 30°. In order to view the display 3 the driver 9 therefore has to turn his view downward by less than 30° from the horizontal. In doing so, an average size of the driver 9 is assumed. Further, the display device 3 generally is located in the middle of the vehicle 9 so that the display 3 may be viewed by the driver 9 as well as by a co-driver.

Arranged within reach of the driver 9 is an operating element 6 which is also coupled to the control unit 1. The operating element 6 may for example be a mechanical operating element, in particular a turn-push-switch, which optionally is surrounded by further mechanical switches, for example key button switches. The "reach" comprises the range into which the driver 9 having an average size may grasp offhand, i.e. without or only by means of a marginal change in his position, in a position typically taken during driving. In order to grasp the operating element 6 the driver 9 in particular does not have or only marginally has to bend forward.

According to an embodiment of the operating apparatus the display device 2 amongst others shows information which is associated with an operation via the operating element 6. For example, displayed by the first display device 2 may be different push buttons which may be activated and selected via the operating element 6. Therefore, a direct operation via the display 3 of the display device 2 is not required. According to a further embodiment of the operating device, however, the display 3 of the display device 2 is formed as a touchscreen. Therefore, the display 3 has a touch-sensitive surface so that an operation also may be carried out directly via the display 3.

Further, coupled to control unit 1 is a voice controller unit which comprises a microphone 4 and a voice recognition unit 5. The microphone 4 may be activated and de-activated by the control unit 1. It detects speech which is spoken within the vehicle 8. The speech 4 detected by the microphone, by means of electrical signals is transmitted to the voice recognition unit 5 which analyzes the speech information and converts it into input signals. For this purpose a memory may be provided for in the voice recognition unit which comprises the entirety of the words which are included in the entirety of the options for the operating steps. In doing so it is feasible to perform an operating step by means of vocalizing a single word or a phrase consisting of several words. The control unit 1 further is coupled to a vehicle bus 7. The devices of the vehicle 8 which are to be operated via the operating apparatus also are coupled to this vehicle bus 7. Further, it is also feasible that some vehicle devices are directly coupled to the control unit 1. From the vehicle devices data are transmitted to the control unit 1 through the vehicle bus 7, if applicable. There, the data are processed. Further, graphic data are generated which are graphically reproduced by the displays 3 of the display device 2. In addition, the user, as for example the driver 9, by means of the operating element 6 or the displays 3 of the display device 2 formed as touchscreens may execute inputs which are transmitted to the control unit 1. There these inputs are processed and converted into control signals as needed by means of which the vehicle devices are controlled.

Furthermore, the control unit 1 is connected to a memory 10 from which data may be read. Stored in the memory 10 may be versatile data which are required for processing of data received from the control unit.

Figure 2:
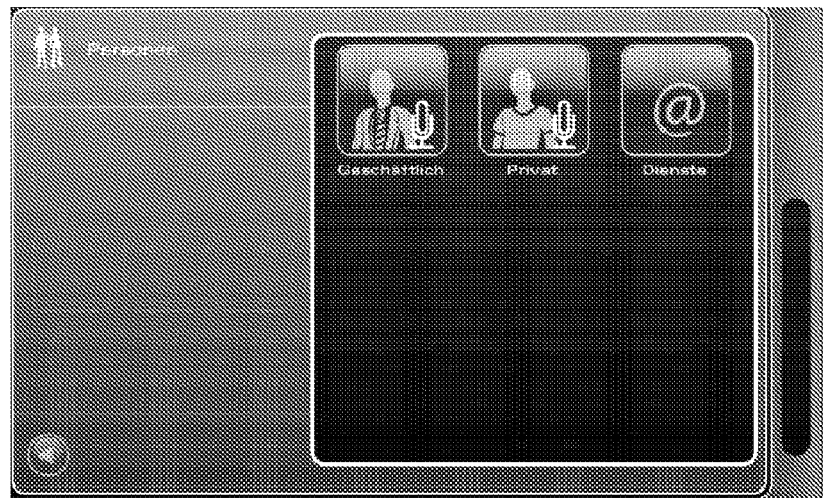
FIG. 2 shows the information of the display in the display device prior to selecting an operating step.

In the following the method and the apparatus according to various embodiments are described by way of example in which a person to contact for example is selected for initiating a phone call:

As shown in FIG. 2, on the display 3 of the display device 2 several push buttons are displayed to the user by means of which he may invoke certain groups of contact persons. As shown in FIG. 2, there is a push button for invoking the business contacts and a push button for invoking the private contacts. Furthermore, on the lower left is a push button by means of which the voice controller may be activated as a global setting. This global activation of the voice controller, however, does not mean that the operation may be carried out via a linguistic input in each case. Rather, with the push buttons where a voice controller is feasible after their actuation, microphones are shown as an additional symbol in order to indicate to the user that after the selection of the respective push button a speech input is feasible.

In the case shown in FIG. 2 the user, via the operating element 6, selects the middle push button for the private contacts. This selection is transmitted to the control unit 1. Thereupon, the function associated with this operating step is executed by the control unit 1 as a list comprising the private contacts of the user is read from memory 10. Synchronous to the execution of this operating step the voice controller for an input following the operating step is automatically activated. The activation of the voice controller is carried out via the control unit 1. The microphone 4 is activated by the control unit 1 and detects speech spoken within the vehicle. At the same time a list comprising private contact persons is displayed on the display 3 of the display device 2. In doing so, associated with each contact person is a push button which may be selected by means of the operating element 6 or via a linguistic input.

Now the user, either by means of a linguistic input or via an input by means of the operating element 6, may select a certain contact person for example for calling.

In order for the voice recognition unit 5 to quickly and securely detect the linguistic input the vocabulary provided for the voice recognition is limited to the names occurring in the list of private contacts.

Figure 3:
FIG. 3 shows the information of the display of the display device for the input following the operating step.

On the basis of FIGS. 2 and 3 an operating step and an input following the operating step which may be carried out haptic or linguistic have been described. However, according to the preceding described manner in general an operating activity may be carried out which comprises several operating steps. In this case an operating step may be carried out by means of a linguistic input or a haptic input independent of wether the preceding operating step was carried out by means of a linguistic input or a haptic input. However, it is feasible that no linguistic input possibility is provided for certain operating steps. In this case the input may only be carried out in haptic manner. A subsequent operating step, however, then may be carried out by means of a linguistic input if generally feasible.

With the method and the apparatus according to various embodiments thus the push-to-talk function which typically is realized in a separate operating element is integrated into the selection of an operating step which foregoes the linguistic input. Hereby the operation is facilitated since no separate push-to-talk button has to be actuated.

Moreover, the vocabulary to be identified is limited during the voice recognition by means of coupling to the current operating context, whereby the voice recognition may be quickened and improved.

REFERENCE NUMERALS 1 control unit
2 display device 3 display
4 microphone
5 voice recognition unit
6 operating element
7 vehicle bus
8 vehicle
9 driver
10 memory

What is claimed is:

1. A method for operating a device of a vehicle, comprising:
displaying simultaneously on a display device:
(a) a plurality of first selectable push buttons, each displaying a different selectable non-voice function, and
(b) a voice controller symbol displayed on at least one of the push buttons displaying the selectable non-voice functions, each voice controller symbol indicating that user selection of an associated non-voice function, via manual user actuation of the associated push button, automatically activates a voice controller for receiving linguistic input following the selected non-voice function, such that prior to activating the voice controller, the display device provides a visual indication of whether each of the non-voice functions is controllable, upon manual selection of that operating step, by linguistic input,
receiving a user selection of a particular one of the first push buttons displaying a particular non-voice function and having a voice controller symbol displayed on the particular push button, and
in response to receiving the user selection of the particular push button, automatically (a) displaying a plurality of second selectable push buttons corresponding to a plurality of sub-functions related to the particular non-voice function and (b) activating the voice controller, the activated voice controller configured to receive linguistic input following the selection of the particular push button, wherein each second push button displays text corresponding to one of the sub-functions, and wherein each sub-function is both (a) selectable by manual user selection of the corresponding second push button and (b) selectable by linguistic input, via the activated voice controller, reciting the displayed text on corresponding second push button.

2. The method according to claim 1, wherein a non-voice function is carried out which comprises several operating steps which are carried out by at least one of a linguistic input and a haptic input, and independent of whether a preceding non-voice function is carried out by a linguistic input or a haptic input the following non-voice function is executable by means of a linguistic input or a haptic input.

3. The method according to claim 1, wherein a defined number of options are provided upon the selection of the particular non-voice function, the options each are associated with words or phrases consisting of multiple words, and by a voice recognition of the voice controller the vocabulary is limited to the words associated with the options or which occur in the phrases of the options for the current non-voice function.

4. The method according to claim 1, wherein the haptic input is carried out by contacting a touch-sensitive surface with an object.

5. An apparatus for operating a device of a vehicle, comprising
a display device configured to simultaneously display:
(a) a plurality of first selectable push buttons, each displaying a different selectable non-voice function, and
(b) a voice controller symbol displayed on at least one of the push buttons displaying the selectable non-voice functions, each voice controller symbol indicating that user selection of an associated non-voice function automatically activates a voice controller for receiving speech input following the selected non-voice function, such that prior to activating the voice controller, the display device provides a visual indication of whether each of the non-voice functions is controllable, upon manual selection of that operating step, by linguistic input,
a first operating unit for receiving a haptic input from a user for selecting a particular one of the first push buttons displaying a particular non-voice function and having a voice controller symbol displayed on the particular push button,
a voice controller unit for receiving a linguistic input from a user for selecting a non-voice function displayed on a push button having an associated displayed voice controller symbol, and
a control unit coupled to the display device, the first operating unit, and the voice controller unit, wherein the control unit is operable to:
automatically activate the voice controller in response to receiving the selection of the selected push butt, and
display a plurality of second selectable push buttons corresponding to a plurality of sub-functions related to the particular non-voice function, wherein each second push button displays text corresponding to one of the sub-functions, and wherein each sub-function is both (a) selectable by manual user selection of the corresponding second push button and (b) selectable by linguistic input, via the activated voice controller, reciting the displayed text on corresponding second push button.

6. The apparatus according to claim 5, wherein the voice controller unit comprises a microphone for detecting spoken speech within the vehicle and a voice recognition unit which converts speech detected by the microphone into input signals which are processable by the control unit.

7. The apparatus according to claim 5, wherein the voice recognition unit is coupled to a memory in which the vocabulary is stored, the words or phrases consisting of several words of which are convertible into input signals by the voice recognition unit, and for non-voice function the vocabulary is limited depending on the words or the words occurring in the phrases associated with a limited number of options of the non-voice function.

8. The apparatus according to claim 5, wherein the first operating unit comprises a touch-sensitive surface.

9. The apparatus according to claim 8, wherein the first operating unit and a display of the display device are provided by a touchscreen.

10. The apparatus according to claim 5, wherein the first operating unit is located offset from the display device in the vehicle.

11. An apparatus for operating a device of a vehicle, comprising
a display device configured to simultaneously display:
(a) a plurality of first selectable push buttons, each displaying a different selectable non-voice function, and
(b) a voice controller symbol displayed on at least one of the push buttons displaying the selectable non-voice functions, each voice controller symbol indicating that user selection of an associated non-voice function automatically activates a voice controller for receiving speech input following the selected non-voice function, such that prior to activating the voice controller, the display device provides a visual indication of whether each of the non-voice functions is controllable, upon manual selection of that operating step, by linguistic input, a haptic input unit configured to receive a selection of a particular one of the first push buttons displaying a particular non-voice function and having voice controller symbol displayed on the particular push button, a voice controller unit, and a control unit coupled to the display device, the haptic input unit, and the voice controller unit, wherein the control unit is operable to:

automatically activate the voice controller unit for receiving and analyzing a linguistic input following the selection of the particular push button, and display a plurality of second selectable push buttons corresponding to a plurality of sub-functions related to the particular non-voice function, wherein each second push button displays text corresponding to one of the sub-functions, and wherein each sub-function is both (a) selectable by manual user selection of the corresponding second push button and (b) selectable by linguistic input, via the activated voice controller, reciting the displayed text on corresponding second push button.

12. The apparatus according to claim 11, wherein the voice controller unit comprises a microphone for detecting spoken speech within the vehicle and a voice recognition unit which converts speech detected by the microphone into input signals which are processable by the control unit.

13. The apparatus according to claim 11, wherein the voice recognition unit is coupled to a memory in which the vocabulary is stored, the words or phrases consisting of several words of which are convertible into input signals by the voice recognition unit, and that for a non-voice function the vocabulary is limited depending on the words or the words occurring in the phrases associated with a limited number of options of the non-voice function.

14. The apparatus according to claim 11, wherein the haptic input unit comprises a touch-sensitive surface.

15. The apparatus according to claim 14, wherein the haptic input unit and a display of the display device are provided by a touchscreen.

16. The apparatus according to claim 11, wherein the haptic input unit is located offset from the display device in the vehicle.

* * * * *